(12) United States Patent
Stappenbeck et al.

(10) Patent No.: US 10,133,855 B2
(45) Date of Patent: Nov. 20, 2018

(54) SYSTEMS AND METHODS FOR ENTITLEMENT MANAGEMENT

(71) Applicant: COMCAST CABLE COMMUNICATIONS MANAGEMENT, LLC, Philadelphia, PA (US)

(72) Inventors: Alfred Joseph Stappenbeck, Seattle, WA (US); Joseph Lesh, Seattle, WA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

(21) Appl. No.: 14/048,678

(22) Filed: Oct. 8, 2013

(65) Prior Publication Data

US 2015/0101069 A1    Apr. 9, 2015

(51) Int. Cl.
*G06F 21/10* (2013.01)
*G06F 21/12* (2013.01)
*H04N 21/254* (2011.01)
*H04N 21/6334* (2011.01)
*H04N 21/658* (2011.01)
*H04L 29/06* (2006.01)

(52) U.S. Cl.
CPC ............ *G06F 21/10* (2013.01); *G06F 21/121* (2013.01); *H04N 21/2541* (2013.01); *H04N 21/63345* (2013.01); *H04N 21/6581* (2013.01); *G06F 2221/0757* (2013.01); *H04L 63/10* (2013.01); *H04L 2209/603* (2013.01); *H04L 2463/101* (2013.01)

(58) Field of Classification Search
CPC ... G06F 21/10; G06F 21/121; H04N 21/2541; H04N 21/6581; H04L 2209/603; H04L 2463/101; H04L 63/10
See application file for complete search history.

(56) References Cited

U.S. PATENT DOCUMENTS

| | | | |
|---|---|---|---|
| 5,988,346 A * | 11/1999 | Tedesco | G06Q 20/342 194/217 |
| 8,266,245 B1 * | 9/2012 | Saviano et al. | 709/217 |
| 8,874,899 B1 * | 10/2014 | Persson | G06F 21/10 713/155 |
| 2006/0021065 A1 * | 1/2006 | Kamperman | G06F 21/10 726/28 |
| 2009/0178070 A1 * | 7/2009 | Mitsuji | G06Q 30/06 725/4 |
| 2010/0281522 A1 * | 11/2010 | Hatakeyama | G06F 21/33 726/4 |

(Continued)

*Primary Examiner* — Jung W Kim
*Assistant Examiner* — Carlos M De Jesus Lassala
(74) *Attorney, Agent, or Firm* — Ballard Spahr LLP (57) ABSTRACT

Systems and methods for managing data are disclosed. One method can comprise receiving a first request for a service, wherein the first request is associated with a first rights package. The first rights package can be processed to determine access to the service. An evaluation key can be generated, wherein the evaluation key represents the determination of access relating to the processing of the first rights package. A second request for a service can be received, wherein the second request is associated with a second rights package. The second rights package can be processed using the evaluation key.

18 Claims, 6 Drawing Sheets

(56) References Cited

U.S. PATENT DOCUMENTS

| | | | | |
|---|---|---|---|---|
| 2012/0291140 A1* | 11/2012 | Robert | ................... | G06F 21/10 |
| | | | | 726/28 |
| 2012/0331529 A1* | 12/2012 | Ibel et al. | ........................ | 726/4 |
| 2013/0132722 A1* | 5/2013 | Bennett et al. | ............... | 713/171 |
| 2013/0159123 A1* | 6/2013 | Hochberg et al. | ........... | 705/26.1 |
| 2013/0174273 A1* | 7/2013 | Grab | ...................... | G06F 21/10 |
| | | | | 726/28 |

\* cited by examiner

SYSTEMS AND METHODS FOR ENTITLEMENT MANAGEMENT

BACKGROUND

Content can be provided to a user though many different devices. Content providers, publishers, and device manufacturers often rely on digital rights management (DRM) and other access control technologies to manage the use of content and content devices. Often, a request for content access requires a fresh evaluation of access rights (e.g., entitlements, user rights, subscription package, etc.) against metadata relating to requested content. Such evaluation techniques can be resource heavy since access to a single content asset can be associated with multiple service providers and associated entitlement packages. These and other shortcomings are identified and addressed by the disclosure.

SUMMARY

It is to be understood that both the following general description and the following detailed description are exemplary and explanatory only and are not restrictive, as claimed. Methods and systems for processing content rights and/or entitlement are described. The systems and methods of the present disclosure can be used to authenticate a user's right to consume content provided to a user via one or more devices. The systems and methods of the present disclosure can be used to control particular content provided to a particular device and/or user.

In an aspect, a method can comprise receiving a first request for a service, wherein the first request is associated with a first rights package. The first rights package can be processed to determine access to the service. An evaluation key can be generated, wherein the evaluation key represents the determination of access relating to the processing of the first rights package. A second request for a service can be received, wherein the second request is associated with a second rights package. The second rights package can be processed using the evaluation key.

In another aspect, a method can comprise receiving a first request for first content from a first user, wherein the first content is associated with a first identifier and the first user is associated with a first rights package. The first rights package can be processed using the first identifier to determine access to the first content. An evaluation key can be generated to represent the determination of access relating to the processing of the first rights package. A second request for second content can be received from a second user, wherein the second content is associated with a second identifier and the second user is associated with a second rights package. The second rights package can be processed using the evaluation key, for example, rather than the second identifier.

In yet another aspect, a method can comprise receiving a request for content, wherein the request is associated with a rights package. It can be determined whether an evaluation key is associated with the rights package. If an evaluation key is associated with the rights package, the request can be processed using the evaluation key. If an evaluation key is not associated with rights package, the rights package can be processed to determine access to the service.

Additional advantages will be set forth in part in the description that follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, the systems and methods of the present disclosure can be used to authenticate a user's right to consume content provided to a user via one or more devices. The systems and methods of the present disclosure can be used to control particular content provided to a particular device and/or user. The systems and methods of the present disclosure can be used to evaluate one or more entitlement packages, such as a group of access rights. The results of the evaluation can be stored. When a subsequent request for evaluation of an entitlement package is received, the entitlement package can be compared to previously evaluated entitlement packages. If the entitlement package has previously evaluated, the stored evaluation can be used to provide evaluation results to the requestor rather than evaluating the entitlements package anew.

Figure 1A:
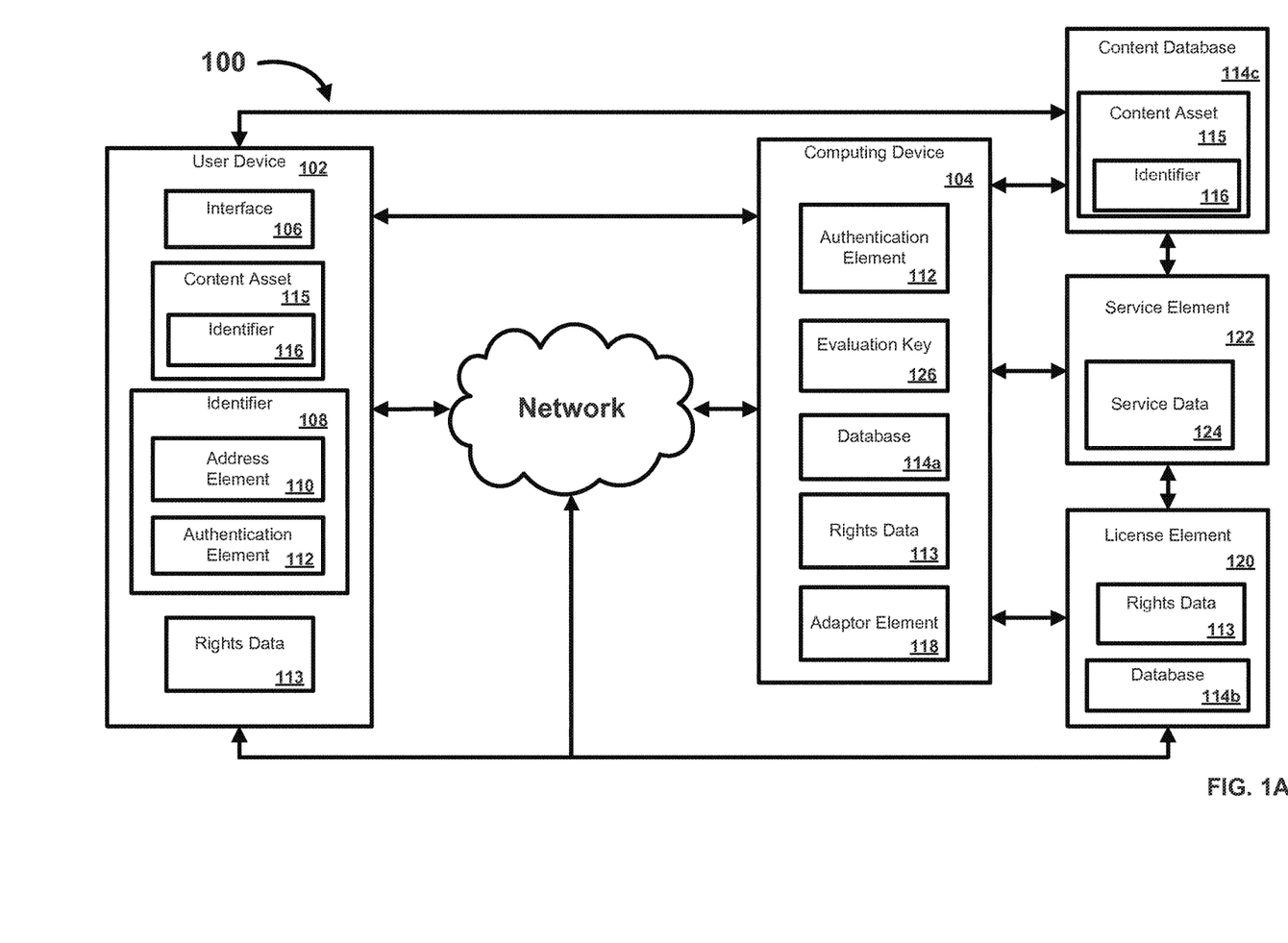
FIG. 1A is a block diagram of an exemplary system and network.
Figure 1B:
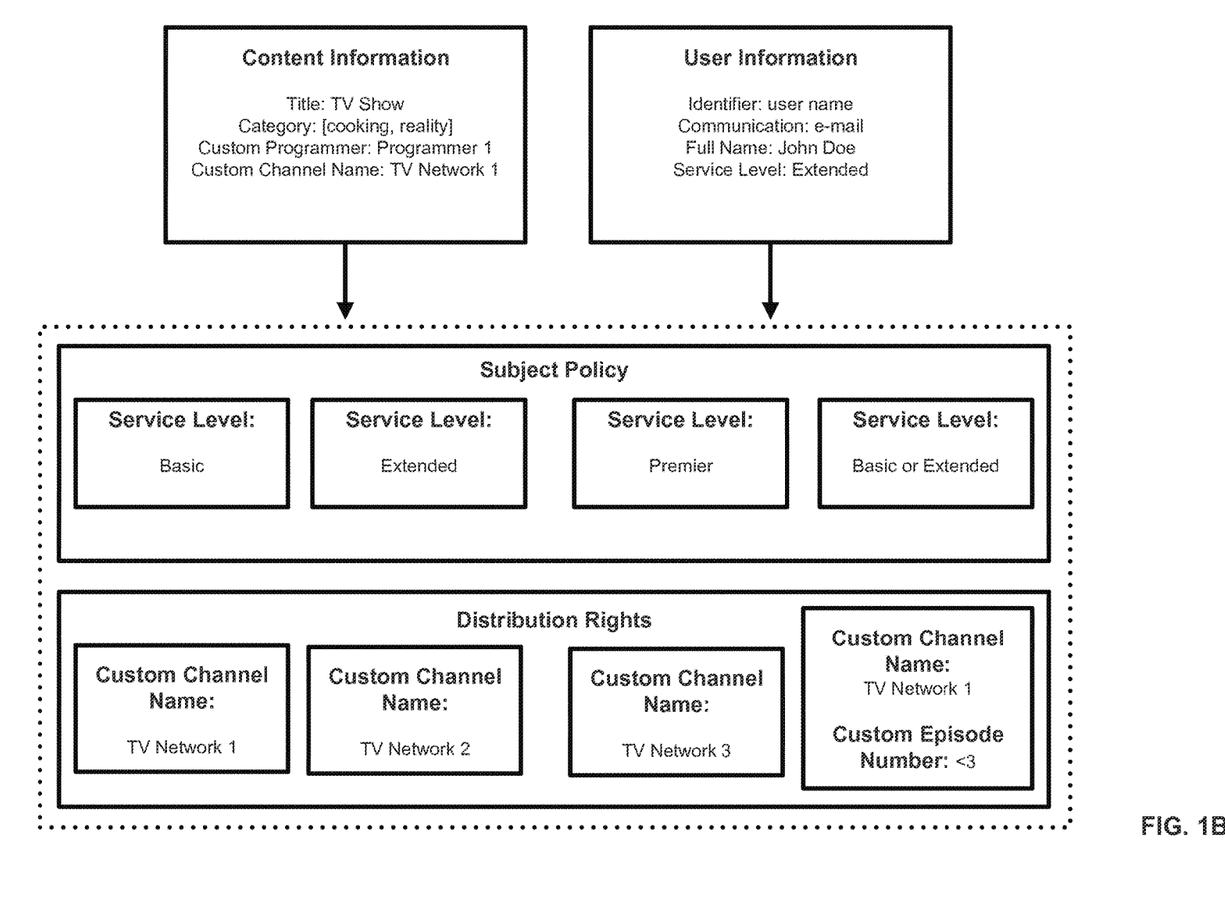
FIG. 1B is a block diagram of an exemplary system and network.

In an aspect, FIGS. 1A-1B illustrate various aspects of an exemplary system and network in which the present methods and systems can operate. The present disclosure relates to systems and methods for managing data. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system and network 100 can comprise a user device 102 in communication with a computing device 104 such as a server, for example. The computing device 104 can be disposed locally or remotely relative to the user device 102. As an example, the user device 102 and the computing device 104 can be in communication via a private or public network such as the Internet. Other forms of communication can be used, such as wired and wireless telecommunication channels, for example.

In an aspect, the user device 102 can be an electronic device, such as a computer, a smartphone, a laptop, a tablet, a set top box, or other device capable of communicating with the computing device 104. As an example, the user device 102 can comprise an interface 106 for providing an interface to a user to interact with the user device 102 and/or the computing device 104. The interface 106 can be any interface for presenting information to the user and receiving a user feedback such as a web interface (e.g., Internet Explorer, Mozilla Firefox, Google Chrome, Safari, or the like). Other software, hardware, and/or interfaces can be used to provide communication between the user and one or more of the user device 102 and the computing device 104. As an example, the interface 106 can request or query various files from a local source and/or a remote source.

In an aspect, the user device 102 can comprise an identifier 108, which, among other things, can be used to: authenticate the user device 102 with a particular network; install drivers; configure a modem; set up a wired or wireless Local Area Network (LAN); secure an operating system; configure browser provider-specifics; provision electronic mail (e.g. create mailboxes and aliases); configure electronic communications; install additional support software; install add-on packages; and the like. As an example, the identifier 108 can comprise one or more address elements 110 and authentication elements 112.

In an aspect, the address element 110 can be a uniform resource identifier (URI) (e.g., a uniform resource locator (URL)), a network address, an Internet address, or the like. As an example, the address element 110 can be relied upon to establish a communication session between the user device 102 and the computing device 104. As a further example, the address element 110 can be any identifier used to distinguish the user device 102 from other devices intercommunicating with the computing device.

In an aspect, the authentication element 112 can be credentials, a token, a character, a string, or the like, for differentiating one user or user device from another user or user device. In an aspect, the authentication element 112 can comprise information for authenticating the user and/or user device 102 with the computing device 104 to facilitate access to data and/or services. As an example, the computing device 104 can be configured to receive and validate the authentication element 112 to facilitate a secure communication between the user device 102 and one or more of the computing devices, such as computing device 104.

In an aspect, rights data 113 can be associated with one or more users and/or user devices 102. In another aspect, the rights data 113 can comprise information relating to the permissions and/or entitlements associated with a particular user and/or device. As an example, the rights data 113 can comprise information, such as subscription information, identification information, location information, and/or timing information relating to a particular user or user device. In an aspect, one or more databases 114a, 114b, 114c can store information, such as rights data 113, relating to users, user preferences, and user devices and configurations. In another aspect, the rights data 113 can be associated with one or more content assets 115 and/or a source of the content assets. The rights data 113 can have time stamps or markers associated therewith.

In an aspect, the computing device 104 can be configured as a license server, an access control system, software as a service, a computing device functioning as a license generation/decision service, and/or an access rights authentication device, and the like. As an example, licenses can be generated to communicate permissions and rights in a particular format (e.g., Adobe FlashAccess, Microsoft Windows Media DRM, Widevine, Microsoft PlayReady, etc.). As a further example, generating a license for any specific technology can comprise matching third party libraries with technology dependency requirements, data expression requirements, operating system architecture requirements, idioms of implementation, and the like. In an aspect, one or more computing devices 104 can be implemented for a particular technology or operating format. As an example, each technology can implement a distinct computing device 104. As a further example, the user device 102 can communicate with the computing device 104 to request and/or receive a content license.

In an aspect, the computing device 104 can be configured to determine access rights or entitlement for a particular user and/or device. In another aspect, a user and/or device can have certain access rights (e.g., user rights) associated with the content that the particular user and/or device can consume. As an example, a user may have the rights to store certain programming on a digital recorder, storage medium, buffer, or the like. As a further example, a user may have rights to consume particular content or programming. In an aspect, the computing device 104 can determine whether a particular user and/or device has appropriate rights to consume certain content.

In an aspect, the computing device 104 can be a server for communicating with the user device 102. As an example, the computing device 104 can manage and/or monitor the intercommunication between the user device 102 and one or more databases 114a, 114b, 114c for sending and receiving data therebetween. In an aspect, the databases 114a, 114b, 114c can store a plurality of information sets (e.g. data sets, files, web pages, content assets, etc.). As an example, the user device 102 can request an information set from the databases 114a, 114b, 114c. As a further example, the user device 102 can retrieve one or more information sets from the databases 114a, 114b, 114c.

In an aspect, one or more databases can be configured as a content database 114c. The content database 114c can store one or more content assets 115. As an example, one or more content assets 115 can comprise one or more of audio content, video content, news, sports programming, advertisements, and the like. As an example, the content database 114c can be configured to transmit data (e.g., content assets 115) to various end-users. In another aspect, one or more identifiers 116 can be associated with one or more content assets 115. As an example, each content asset 115 can be associated with a unique identifier. As a further example, the identifier 116 can be or comprise a token, a character, a string, or the like, for differentiating one content asset 115 from another content asset 115.

In an aspect, the user device 102 can receive one or more content assets 115. As an example, the user device 102 can be authenticated (e.g., via the authentication element 112) prior to receiving one or more content assets 115. As a further example, the user device 102 can request authentication via the computing device 104 or the like.

In an aspect, the user device 102 can request entitlement (e.g., a license, rights confirmation, etc.) to consume (e.g., view, store, transfer, record, manipulate, etc.) the received content asset 115. As an example, rights data 113 associated with one or more of a user, the user device 102, and the received content asset 115 can be analyzed to determine entitlement. As a further example, the user device 102 can request entitlement via the computing device 104 and/or a device (e.g., license element 120, service element 122) configured to evaluate entitlements.

In an aspect, an adapter element 118 can be configured to facilitate interaction between a first device (e.g., user device 102, computing device 104) or element (e.g., software) and a second device or element (e.g., license element 120, service element 122). As an example, the adapter element 118 can be associated with the computing device 104 to facilitate analysis and/or fulfillment of entitlement requests. As a further example, one or more adapter elements 118 can be selected based on characteristics associated with the entitlement request. Characteristics can comprise a user identifier, device identifier 108, rights data 113, content asset characteristics, content asset identifier 116, or the like. In an aspect, an entitlement request can comprise a user identifier, a content asset identifier, and rights data 113. A first one of the adapter elements 118 can be selected to interact with user specific services or devices based upon the user identifier. As an example, the first one of the adapter elements 118 can be configured to retrieve metadata relating to the user from a system (e.g., user-related data service, user profile service, billing system) external to the computing device 104. A second one of the adapter elements 118 can be selected to interact with content specific services or devices based upon the content asset identifier. As an example, the second one of the adapter elements 118 can be configured to retrieve metadata relating to the content asset user from a system (e.g., content provider, media service) external to the computing device 104.

In an aspect, the license element 120 can be in communication with one or more computing devices, such as computing device 104 and/or user device 102, to determine access rights or entitlement for a particular user, data (e.g., content) and/or device. As an example, the license element 120 can be configured as an access control system, software as a service, a computing device functioning as a license decision service, and/or an access rights authentication device. In an aspect, a user and/or device can have certain access rights associated with the content that the particular user and/or device can consume. As an example, a user may have the rights to store certain programming on a digital recorder, storage medium, buffer, or the like. As a further example, a user may have rights to consume particular content or programming. In an aspect, the license element 120 can determine whether a particular user and/or device has appropriate rights to consume certain content. As an example, the license element 120 can communicate a determination (e.g., a decision) of entitlement to one or more computing devices such as computing device 104 and/or user device 102.

The license element 120 can be an access control system, software as a service, a computing device functioning as a license generation service, and/or an access rights authentication device, and the like. As an example, licenses can be generated to communicate permissions and rights in a particular format (e.g., Adobe FlashAccess, Microsoft Windows Media DRM, Widevine, Micro soft PlayReady, etc.). As a further example, generating a license for any specific technology can comprise matching third party libraries with the technology dependency requirements, data expression requirements, operating system architecture requirements, idioms of implementation, and the like.

In an aspect, the license element 120 can be configured to determine entitlements based upon information relating to a user, such as an identifier and/or rights data 113. As an example, the license element 120 can validate user rights by comparing user information (e.g., metadata relating to the user, metadata of the entitlement request, etc.) to rights data 113 to determine if a user requesting data and or services has the appropriate user rights to receive and/or consume the data or services. As another example, the license element 120 can request user validation from another device, such as the computing device 104. As a further example, one or more adapter elements 118 can facilitate the user validation between the license element 120 and the computing device 104.

In an aspect, the service element 122 can be configured to determine entitlements based upon information (e.g., a content identifier and/or service data 124) relating to a service (e.g., content delivery). As an example, the service element 122 can validate entitlements by comparing service data 124 (e.g., metadata relating to services, metadata relating to the content, metadata of the entitlement request, etc.) to rights data 113 to determine if a requested data and or service can be provided. As another example, the service element 122 can request user validation from another device, such as the computing device 104. As a further example, one or more adapter elements 118 can facilitate the user validation between the service element 122 and the computing device 104.

As illustrated in FIG. 1B, one or more license decisions can be determined based on informational components such as content information, user information, and a rights package (e.g., rights data 113 (FIG. 1A)) such as subject policy (e.g., subscriber group policy) and/or distribution rights (e.g., subscription package information). Two or more of the information components can be interrelated. For example, a subject policy can be dependent on user information. As another example, distribution rights can be dependent on the subject policy and/or content information. As a further example, license decisions can be based upon an analysis of a rights package (e.g., a grouping of rights data, subject policies, distribution rights, etc.) comprising information relating to the permissions and/or entitlements associated with a particular user and/or device. As an example, the rights package can comprise information, such as subscription information, identification information, location information, and/or timing information relating to a particular user or user device. In an aspect, a rights package can be device-specific. In another aspect, a rights package can be user specific allowing one or more users to request content via the same device, while license decisions are based upon the user. For example, a parent may have a first rights package associated with a device, while a child may have a second rights package with different entitlements than the first rights package.

In an aspect, content information can comprise information relating to one or more content assets. As an example, content information can comprise information such as title, category, type, genre, provider, programmer, channel name, channel type, etc. Other information can be provided relating to one or more content assets such as duration, version, quality, etc.

In an aspect, user information can comprise information relating to one or more users or devices. As an example, user information can comprise information such as an identifier, communication type, name, service level, address, billing information, user rights, user history, and the like.

In an aspect, subject policy information can comprise information relating to one or more services, policies, subscription packages, service levels, etc. As an example, the subject policy information can comprise information such as one or more of a basic service level, extended service level, and premier service level. As a further example, the subject policy information can be compared to one or more of the content information and the user information to determine whether a user has permission to access a particular content asset.

In an aspect, distribution rights can comprise information relating to one or more user rights, permissions, entitlements, and the like. As an example, the distribution rights can comprise information relating to user permission for one or more content assets, content channels, content episodes, versions, etc.

In an aspect, entitlements relating to one or more of a user, service, and data can be evaluated to determine if a user can receive requested services or data. As an example, when entitlements are evaluated, an evaluation key 126 can be generated to represent the results of the evaluation. The evaluation key 126 can comprise metadata relating to the access or denial of services or data based on one or more entitlement packages. As an example, an identifier can be associated with the evaluation key 126 to facilitate interactions with the evaluation key 126, while distinguishing one evaluation key 126 from other evaluation keys 126. In another aspect, the evaluation key 126 can comprise information to facilitate the access or denial of a request for service or data. As an example, when a request for content is received from a particular user and relating to a particular content asset or channel, the request can be evaluated based on the evaluation key 126 rather than an entitlement package (e.g., access rights, user rights, content rights).

In an aspect, the evaluation key 126 can associate (e.g., map, link, etc.) a particular granting or denying subscription package with a particular content asset (e.g., media object). As an example, an identifier relating to a content asset (e.g., id=http://media/1) and an identifier relating to a subscription package (e.g., id=http://distributionright/2) can be concatenated together as a string and used as a hashable key (e.g., EvaluationKey=http://media/1http://distributionright/2).

In an aspect, the evaluation key 126 (e.g., hashable key) can be used as a unique compound identifier for a match/no-match determination to allow or deny subsequent requests. The evaluation key 126 can be created whenever an evaluation of rights is completed. The evaluation key 126 can be stored in a fast lookup map data structure along with a corresponding match/non-matching result. As an example, the evaluation key 126 can be serialized in table format, such as shown below:

| EvaluationKey | Subscription Package | Package Id | Media | Media Id | Evaluation Result |
|---|---|---|---|---|---|
| package/1-media/2 | Channelname = TV 1 | Package/1 | Channelname = TV 2 | Media/2 | false |
| package/2-media/2 | Channelname = TV 2 | Package/2 | Channelname = TV 2 | Media/2 | true |
| package/3-media/2 | Channelname = TV 3 | Package/3 | Channelname = TV 2 | Media/2 | false |
| package/2-media/3 | Channelname = TV 2 | Package/2 | Channelname = TV 3 | Media/3 | false |

A rights package can comprise one or more subscription packages and/or associated media data. In an aspect, an evaluation key can be associated with a rights package. Other formats can be used, such as CSV and the like.

Figure 2:
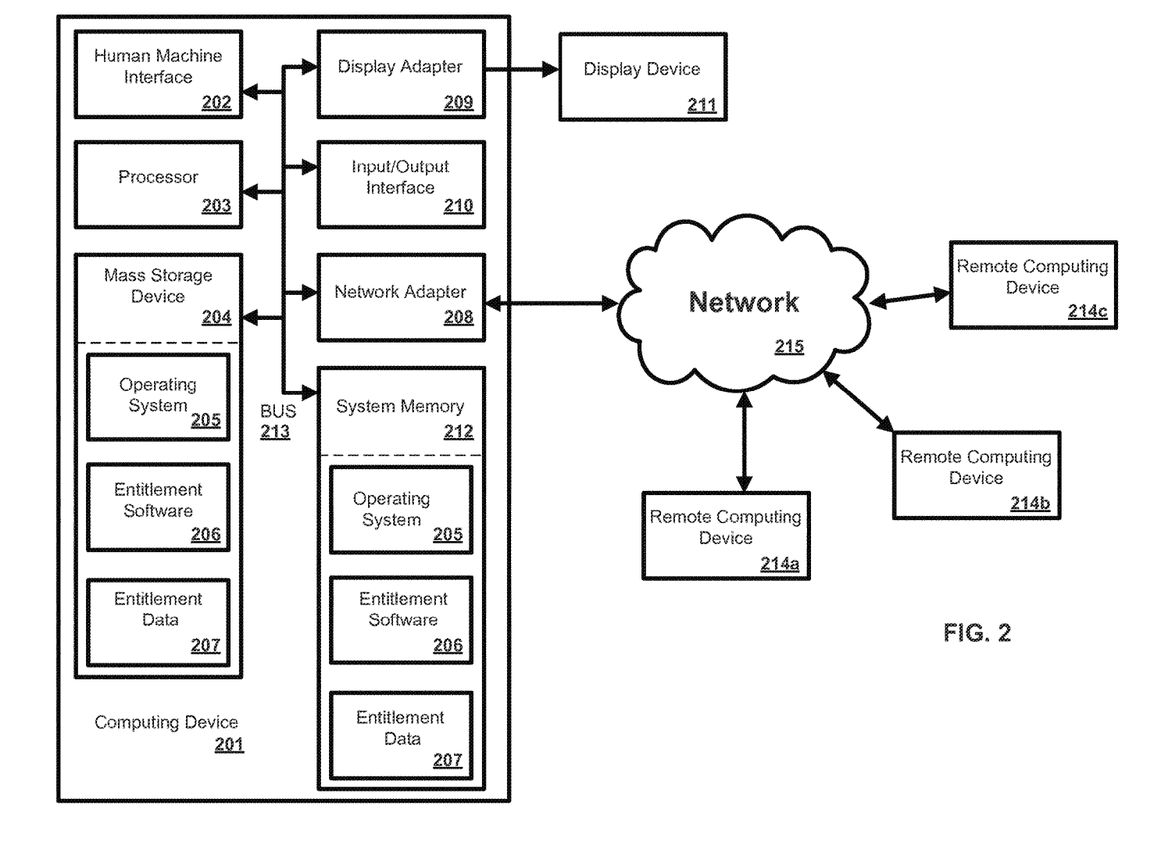
FIG. 2 is a block diagram of an exemplary computing system.

In an exemplary aspect, the methods and systems can be implemented on a computing system such as computing device 201 as illustrated in FIG. 2 and described below. By way of example, one or more of the user device 102 and the computing device 104 of FIG. 1A can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processors 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, entitlement software 206, entitlement data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as entitlement data 207 and/or program modules such as operating system 205 and entitlement software 206 that are immediately accessible to and/or are presently operated on by the processor 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and entitlement software 206. Each of the operating system 205 and entitlement software 206 (or some combination thereof) can comprise elements of the programming and the entitlement software 206. Entitlement data 207 can also be stored on the mass storage device 204. Entitlement data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processor 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computing device 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display device 211 and computing device 201 can be part of one device, or separate devices.

The computing device 201 can operate in a networked environment using logical connections to one or more remote computing devices 214*a,b,c*. By way of example, a remote computing device can be a personal computer, portable computer, a smart phone, a server, a router, a network computer, a peer device or other common network node, and so on. Logical connections between the computing device 201 and a remote computing device 214*a,b,c* can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of entitlement software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g. ant algorithms), and hybrid intelligent systems (e.g. Expert inference rules generated through a neural network or production rules from statistical learning).

Figure 3:
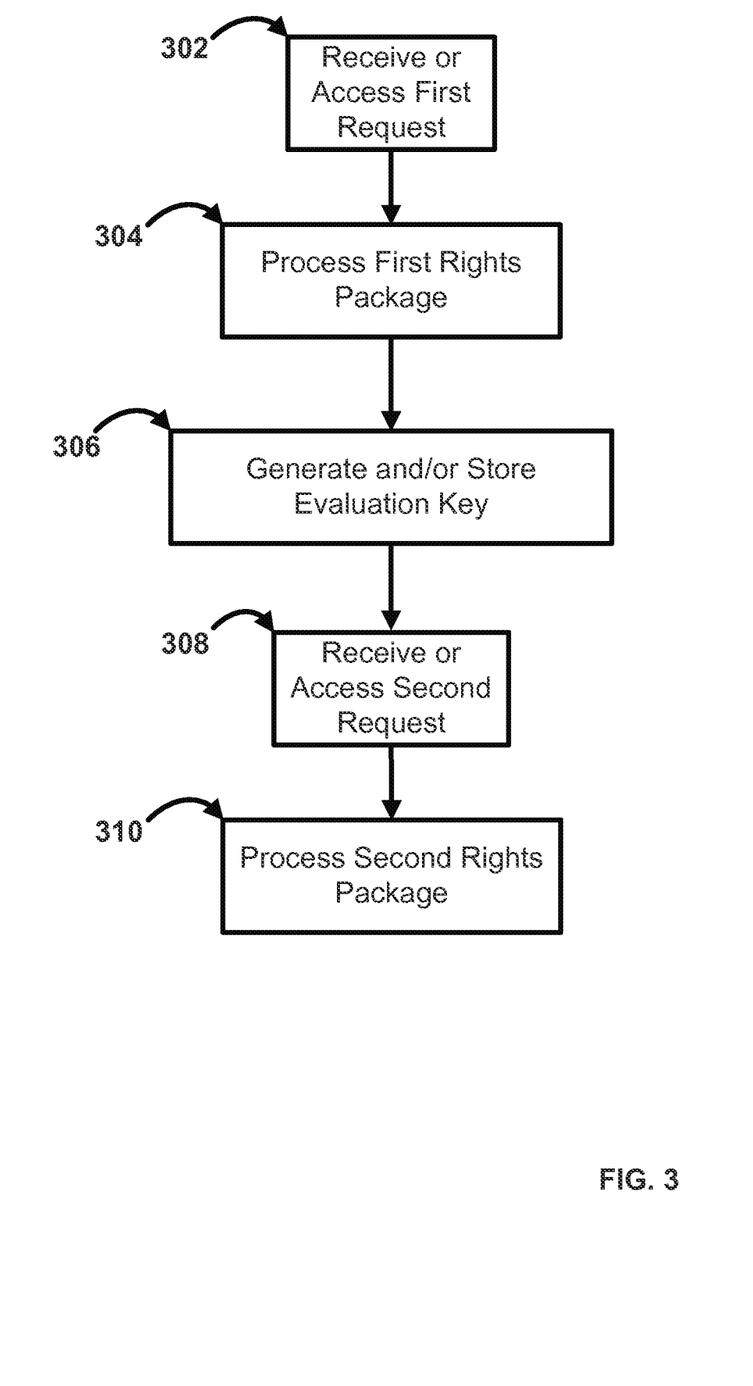
FIG. 3 is a flow chart of an exemplary method.

In an aspect, illustrated in FIG. 3, provided are methods for managing data. In step 302, a first request can be received or accessed. In an aspect, the first request can relate to a service and/or data requested. As an example, the service can be or can comprise one or more of a content service, communication service, network service, subscription service, and the like. In another aspect, the first request can be associated with a first rights package. A rights package (e.g., a grouping of rights data) comprising information relating to the permissions and/or entitlements associated with a particular user and/or device. As an example, the rights package can comprise information, such as subscription information, identification information, location information, and/or timing information relating to a particular user or user device. In an aspect, a rights package can be device-specific. In another aspect, a rights package can be user specific allowing one or more users to request content via the same device, while license decisions are based upon the user. For example, a parent may have a first rights package associated with a device, while a child may have a second rights package with different entitlements than the first rights package.

In an aspect, the first rights package can relate to a subscription service such as media subscription. In another aspect, the first rights package can comprise a rule relating to access rights. For example, the rule can relate to the granting or denial of a right to access content by a device or user. As another example, the rule can grant or deny access to a particular content channel, content type, content asset, content version, and the like based upon an evaluation of whether the access is supported by the first rights package.

In step 304, the first rights package can be processed to determine access to the service. In an aspect, processing the first rights package can comprise comparing at least a portion of the first rights package to a comparator associated with the requested service. In another aspect, the comparator can comprise one or more informational components, such as content information, user information, subject policy (e.g., subscriber group policy), and distribution rights (e.g., subscription package information. In a further aspect, the comparator can comprise one or more information fields, such as URI ContentId, URI ReleaseId, Date Added, URI AddedByUserId, List<String> AdminTags, URI AdPolicyId, Boolean Approved, String Author, Date AvailableDate, List<String> Categories, List<URI> CategoryIds, String Copyright, String CopyrightUrl, List<String> Countries, String DefaultThumbnailUrl, String Description, Boolean ExcludeCountries, Date ExpirationDate, String Guide, URI mediaId, String Keywords, String Link, URI OwnerId, String Provider, URI ProviderId, Date PubDate, List<String> Ratings, URI RestrictionId, String Text, String Title, Date Updated, URI UpdatedByUserId, Map<String, Object> CustomFieldsMap, Date mediafileadded, URI mediafileaddedByUserId, Boolean mediafileallowRelease, Boolean mediafileapproved, Double mediafileaspectRatio, List<URI> mediafileassetTypeIds, List<String> mediafileassetTypes, Integer mediafileaudioChannels, String mediafileaudioCodec, Integer mediafileaudioSampleRate, Integer mediafileaudioSampleSize, String mediafileauthor, Long mediafilebitrate, SortedMap<String, String> mediafilechecksums, String mediafilecontentType, String mediafiledescription, String mediafiledownloadUrl, Duration mediafileduration, Boolean mediafileexists, String mediafileexpression, String mediafilefailoverSourceUrl, String mediafilefailoverStreamingUrl, String mediafilefilePath, Long mediafilefileSize, String mediafileformat, Double mediafileframeRate, String mediafileguid, Integer mediafileheight, URI mediafileid, Boolean mediafileisDefault, Boolean mediafileisProtected, Boolean mediafileisThumbnail, String mediafilelanguage, URI mediafilemediaId, URI mediafileownerId, String mediafileprotectionKey, String mediafileprotectionScheme, URI mediafileserverId, URI mediafilesourceMediaFileId, Duration mediafilesourceTime, String mediafilesourceUrl, String mediafilestorageUrl, String mediafilestreamingUrl, URI mediafiletransformId, String mediafiletitle, Date mediafileupdated, URI mediafileupdatedByUserId, String mediafileurl, String mediafilevideoCodec, Integer mediafilewidth, Map<String, Object> mediafilecustomFieldsMap, Date releaseadded, URI releaseaddedByUserId, URI releaseadPolicyId, Boolean releaseapproved, String releaseauthor, String releasedelivery, String releasedescription, URI releasefileId, String releaseguid, URI releaseid, URI releasemediaId, URI releascownerId, String releasepid, String releaseparameters, String releasetitle, Date releaseupdated, URI releaseupdatedByUserId, String releaseurl, URI releaserestrictionId, Map<String, Object> releasecustomFieldsMap, etc.

In a further aspect, the comparator can comprise one or more operators, such as equals( ), equalsIgnoreCase(MatchDataType.string), greaterThan(MatchDataType.integer), greaterThan(MatchDataType.decimal), greaterThan(MatchDataType.date), greaterThan(MatchDataType.dateTime), greaterThan(MatchDataType.duration), greaterThan(MatchDataType.time), lessThan(MatchDataType.integer), lessThan(MatchDataType.decimal), lessThan(MatchDataType.date), lessThan(MatchDataType.dateTime), lessThan(MatchDataType.duration), lessThan(MatchDataType.time), contains(MatchDataType.string), startsWith(MatchDataType.string), endsWith(MatchDataType.string), regexp(MatchDataType.string), etc.

In a further aspect, the comparator can comprise one or more data types, such as bool(Boolean.class), integer (Long.class), decimal(Double.class), string(String.class), dateTime(Date.class), date(DateOnly.class), time(Time.class), duration(Duration.class), uri(URI.class), link(Link.class), image(Image.class), etc.

In a further aspect, the comparator can comprise one or more data structures, such as single, list, map, and the like. In yet a further aspect, the determination of access comprises granting access or denying access.

In step 306, an evaluation key can be generated. In an aspect, the evaluation key can represent the determination of access relating to the processing of the first rights package. In another aspect, the evaluation key can be stored for subsequent retrieval and/or processing. As an example, an identifier can be associated with the evaluation key to facilitate subsequent retrieval and/or processing.

In step 308, a second request for a service can be received. As an example, the second request can relate to the same service as the first request. As a further example, the second request can be associated with a second rights package. In an aspect, the second rights package can be the same or similar to the first rights package. In step 310, the second rights package can be processed using the evaluation key to determine access to the requested service. In an aspect, rather than processing the second rights package in a manner similar to the processing of the first rights package, the evaluation key can be processed (e.g., accessed) in order to retrieve a determination of grant/denial of access. As an example, when the second rights package is similar to the first rights package, the second rights package does not need to be evaluated. Rather, the similarity with the first rights package facilitates the use of the same access decision that is represented by the evaluation key. Each rights package that is similar to the first rights package and received subsequent the generation of the evaluation key can rely on the evaluation key to determine access for the requesting device/user. The evaluation key can be used to minimize processing time and resource for multiple evaluations of the same or similar right packages, thereby improving efficiency of the evaluation process.

Figure 4:
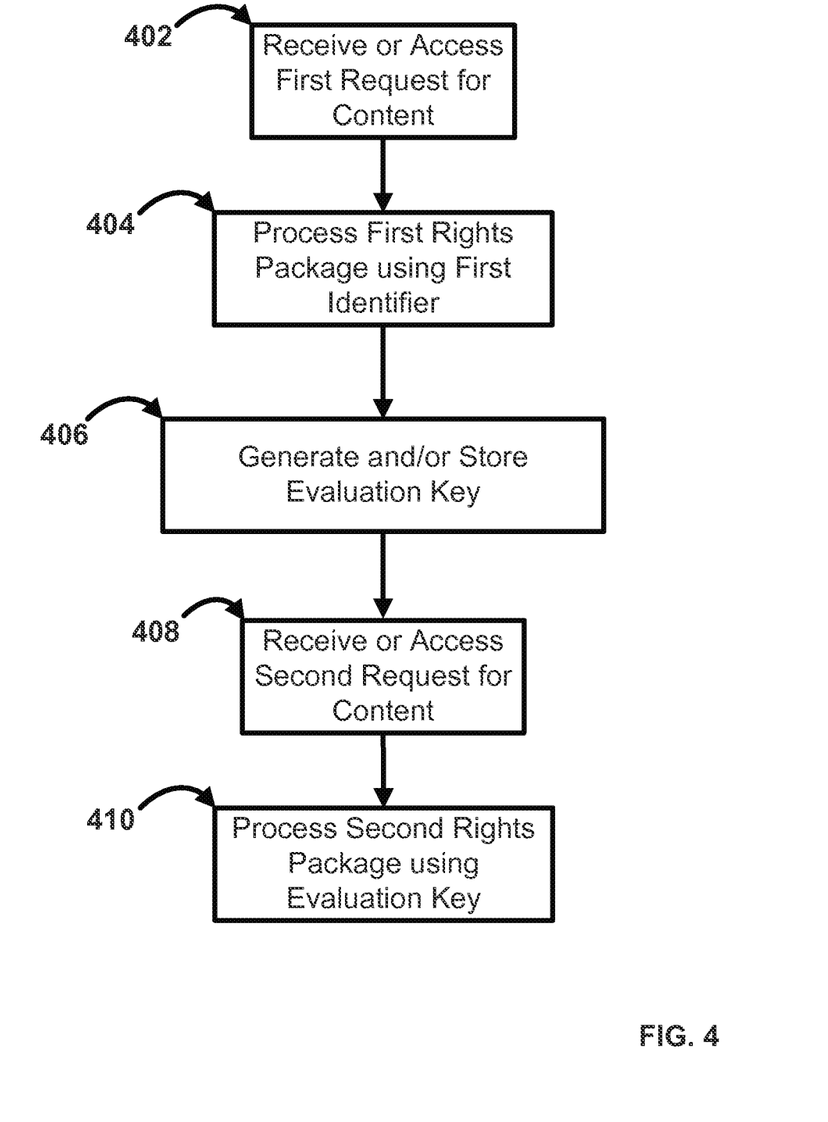
FIG. 4 is a flow chart of an exemplary method.

FIG. 4 illustrates an exemplary method for managing data. In step 402, a first request can be received or accessed. In an aspect, the first request can relate to first content. As an example, an identifier can be associated with the requested first content. In another aspect, the first request can be associated with a first user. In yet a further example, a first rights package can be associated with one or more of the first user and the requested first content. As an example, the first rights package can relate to a subscription service. As a further example, the first rights package can comprise a rule relating to access rights. In another aspect, the first rights package can comprise a rule relating to access rights. For example, the rule can relate to the granting or denial of a right to access content by a device or user. As another example, the rule can grant or deny access to a particular content channel, content type, content asset, content version, and the like based upon an evaluation of whether the access is supported by the first rights package.

In step 404, the first rights package can be processed to determine access to the service. As an example, the first rights package can be processed using the identifier. In an aspect, processing the first rights package can comprise comparing at least a portion of the first rights package to a comparator associated with the requested service. In yet a further aspect, the determination of access comprises granting access or denying access. As an example, the determination of access can comprise confirming a user identity to facilitate user-specific grant of access.

In step 406, an evaluation key can be generated. In an aspect, the evaluation key can represent the determination of access relating to the processing of the first rights package. In another aspect, the evaluation key can be stored for subsequent retrieval and/or processing. As an example, an identifier can be associated with the evaluation key to facilitate subsequent retrieval and/or processing.

In step 408, a second request can be received or accessed. In an aspect, the second request can relate to second content. As an example, an identifier can be associated with the requested second content. As another example, the second content can relate to the same content asset as the first content. In another aspect, the second request can be associated with a second user. In yet a further example, a second rights package can be associated with one or more of the second user and the requested second content. As an example, the second rights package can relate to a subscription service. As a further example, the second rights package can comprise a rule relating to access rights.

In step 410, the second rights package can be processed using the evaluation key to determine access to the requested service. In an aspect, rather than processing the second rights package in a manner similar to the processing of the first rights package, the evaluation key can be processed (e.g., accessed) in order to retrieve a determination of grant/denial of access. As an example, when the second rights package is similar to the first rights package, the second rights package does not need to be evaluated. Rather, the similarity with the first rights package facilitates the use of the same access decision that is represented by the evaluation key. Each rights package that is similar to the first rights package and received subsequent the generation of the evaluation key can rely on the evaluation key to determine access for the requesting device/user. The evaluation key can be used to minimize processing time and resource for multiple evaluations of the same or similar right packages, thereby improving efficiency of the evaluation process.

Figure 5:
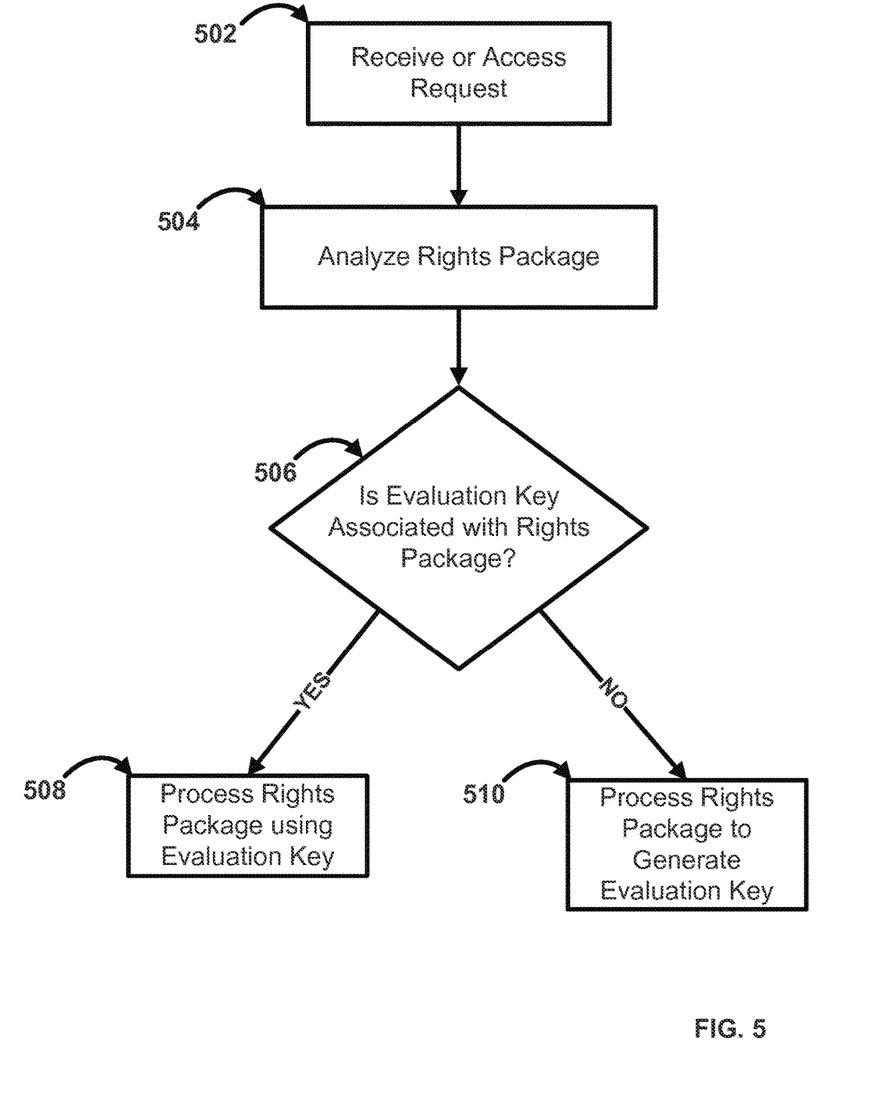
FIG. 5 is a flow chart of an exemplary method.

FIG. 5 illustrates an exemplary method for managing data. In step 502, a request can be received or accessed. In an aspect, the request can relate to a service and/or data requested. As an example, the service can be or can comprise one or more of a content service, a communication service, a network service, and a subscription service. In another aspect, the request can be associated with a rights package. As an example, the rights package can relate to a subscription service. As a further example, the rights package can comprise a rule relating to access rights.

In step 504, a rights package can be analyzed, for example, based on the received or accessed request. In an aspect, through such analysis, it can be determined whether an evaluation key is associated with the rights package, at 506. In an aspect, the evaluation key can represent the determination of access relating to the processing of the first rights package. In another aspect, the evaluation key can be stored for subsequent retrieval and/or processing. As an example, an identifier can be associated with the evaluation key to facilitate subsequent retrieval and/or processing.

If an evaluation key is associated with the rights package, the request can be processed using the evaluation key, at step 508. If an evaluation key is not associated with rights package, the rights package can be processed to generate an evaluation key, at 510. Each rights package that is associated with the evaluation key and received subsequent the generation of the evaluation key can rely on the evaluation key to determine access for the requesting device/user. The evaluation key can be used to minimize processing time and resource for multiple evaluations of the same or similar right packages, thereby improving efficiency of the evaluation process.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    receiving, from a first user device associated with a first user, a first request for a service, wherein the first request is associated with a first rights package;
    determining, based on a comparison of at least a portion of the first rights package with a comparator associated with the service, access to the service;
    storing an indication of the access;
    generating an evaluation key configured to facilitate a loading of the stored indication of the access, wherein the evaluation key comprises a first identifier relating to the service and a second identifier relating to the first rights package;
    receiving, from a second user device different from the first user device and associated with a second user different from the first user, a second request for the service, wherein the second request is associated with a second rights package;
    determining that the second rights package is associated with the evaluation key;
    loading, using the evaluation key, the stored indication of the access; and
    processing the second request for the service using the stored indication of the access.

2. The method of claim 1, wherein the service comprises one or more of a content service, a communication service, a network service, or a subscription service.

3. The method of claim 1, wherein one or more of the first rights package or the second rights package comprises a rule relating to access rights.

4. The method of claim 1, wherein one or more of the first rights package or the second rights package comprises a subscription package.

5. The method of claim 1, wherein the comparator comprises one or more of content information, user information, subject policy information, or distribution rights information.

6. The method of claim 1, wherein determining the access to the service comprises granting access or denying access.

7. The method of claim 1, wherein processing the second request further comprises:
comparing the first identifier with a third identifier associated with the second rights package; and
determining that the first identifier is the same as the third identifier.

8. The method of claim 7, wherein processing the second request comprises:
comparing the second identifier with an identifier associated with the second rights package; and
determining that the second identifier is the same as the identifier associated with the second rights package.

9. A method comprising:
receiving, from a first device associated with a first user, a first request for first content, wherein the first content is associated with a first identifier and the first user is associated with a first rights package;
processing, based on the first identifier, the first rights package to determine access to the first content;
storing an indication of the access;
generating an evaluation key configured to facilitate a loading of the stored indication of the access, wherein the evaluation key comprises the first identifier and a second identifier, and wherein the second identifier is associated with the first rights package;
receiving, from a second device different from the first device and associated with a second user different from the first user, a second request for second content, wherein the second user is associated with a second rights package;
determining that the second rights package is associated with the evaluation key;
loading, using the evaluation key, the stored indication of the access; and
processing the second request using the stored indication of the access.

10. The method of claim 9, wherein one or more of the first rights package or the second rights package comprises a rule relating to access rights.

11. The method of claim 9, wherein one or more of the first rights package or the second rights package comprises a subscription package.

12. The method of claim 9, wherein processing the first rights package comprises comparing at least a portion of the first tights package to the first identifier.

13. The method of claim 9, wherein the processing the first rights package using the first identifier to determine access to the first content further comprises granting access or denying access.

14. The method of claim 9, further comprising storing the evaluation key.

15. The method of claim 9, wherein processing the second request comprises:
comparing the first identifier with a third identifier associated with the second content; and
determining that the first identifier is the same as the third identifier.

16. The method of claim 15, wherein processing the second request comprises:
comparing the second identifier with an identifier associated with the second rights package; and
determining that the second identifier is the same as the identifier associated with the second rights package.

17. A method comprising:
receiving, from a first user device associated with a first user, a request for a content asset, wherein the request is associated with a rights package;
determining if an evaluation key is associated with the rights package and the content asset, wherein the evaluation key is based upon an evaluation of a previous request from a second user device different from the first user device and associated with a second user different from the first user, wherein the previous request comprises a previous content asset and a previous rights package, and wherein the evaluation key comprises a first identifier relating to the previous rights package and a second identifier relating to the previous content asset;
if the evaluation key is associated with the rights package and the content asset, loading an indication of access to the previous content asset and corresponding to the previous rights package to process the request; and
if the evaluation key is not associated with the rights package or the content asset, processing, based on the rights package, the request to determine access to the content asset.

18. The method of claim 17, wherein processing the request using the rights package comprises comparing at least a portion of the rights package to a comparator associated with the content asset.

* * * * *